(No Model.)

C. A. BRYANT.
GLOVE FASTENER.

No. 423,666. Patented Mar. 18, 1890.

Witnesses
J. N. Shumway
Lillian D. Kelsey

Charles A. Bryant,
Inventor
By attys.
Earle & Seymour

UNITED STATES PATENT OFFICE.

CHARLES A. BRYANT, OF WAKEFIELD, MASSACHUSETTS.

GLOVE-FASTENER.

SPECIFICATION forming part of Letters Patent No. 423,666, dated March 18, 1890.

Application filed December 24, 1889. Serial No. 334,840. (No model.)

*To all whom it may concern:*

Be it known that I, CHARLES A. BRYANT, of Wakefield, in the county of Middlesex and State of Massachusetts, have invented a new Improvement in Glove-Fasteners, (B;) and I do hereby declare the following, when taken in connection with accompanying drawings and the letters of reference marked thereon, to be a full, clear, and exact description of the same, and which said drawings constitute part of this specification, and represent, in—

Figure 1:
Figure 2:
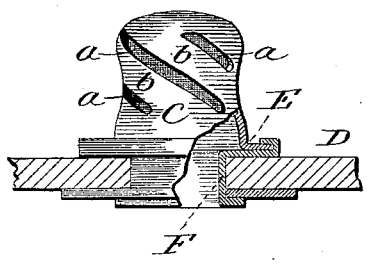
Figure 3:
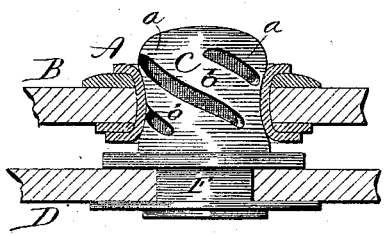
Figure 4:
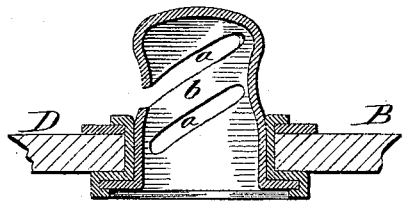
Figure 5:
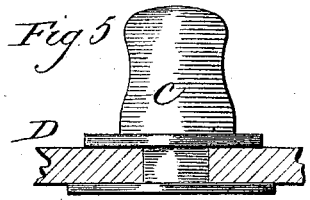

Figure 1, an unyielding socket member; Fig. 2, a side view of the stud member in partial section, showing the invention as applied to the said stud member; Fig. 3, the unyielding socket and the yielding stud as set together; Fig. 4, the invention as applied to a yielding socket; Fig. 5, an unyielding stud adapted to engage said yielding socket.

This invention relates to an improvement in that class of glove-fasteners which consist of two members—one a headed stud attached to the one flap and the other a socket member attached to the other flap and adapted for the introduction of the head into the socket. In some cases the stud member is made elastic, so as to practically contract its diameter, that it may enter an inelastic socket. In others the socket is made elastic and the stud solid, and so that the socket yields as the head of the stud passes through it. In both these constructions of the socket and stud the yielding of the elastic part is in a radial plane only.

The object of my invention is to make the elasticity of the yielding member in a spiral direction, and whereby the increased length of spring is attained, and so that the contraction substantially reduces the diameter in all directions; and the invention consists in constructing the elastic member of tubular shape, closed at one end, contracted beneath the closed end to form a neck, and having several slits running from the closed end spirally around and toward the base end of the stud, as more fully hereinafter described.

I will first describe the invention as applied to the stud member.

A represents the socket member of the glove-fastener, which is secured to the flap B. This socket member may be of any of the usual or known constructions for this class of fasteners, the opening through it or into the socket being of somewhat less diameter than the diameter of the head of the stud, but in this case is inelastic.

C represents the stud which is secured to the flap D of the glove. The stud C is constructed from sheet metal drawn into tubular shape, closed at its head end, but contracted under the closed end, so as to form a head with a contracted neck, and the stud is constructed with a flange E, by which it may be secured to the flap D. As here represented, this means of securing is an eyelet F, the flange of which is closed around the flange of the stud, the tube of the eyelet extending through the flap and so as to be closed down upon the reverse side; but the means of securing the stud constitutes no part of my present invention further than that it shall possess some means for being so secured. Through the stud several slits $a$ are formed. These slits, starting from the closed end of the head, run spirally or obliquely downward toward the base end of the stud, as seen in Fig. 2. The metal of which the stud is formed being elastic, the portions $b$ between the slits form springs, which yield circumferentially to pressure applied upon the outside of the stud, and so that as the stud is forced into the socket a twisting action will be produced upon the stud, which will contract its head sufficiently for it to pass freely into the socket, and then, after having passed into the socket, the reaction of the spring will cause the head to expand, so as to engage the socket, as seen in Fig. 3. On withdrawing the stud from the socket a like contraction of the stud is produced, the stud resuming its normal position after its withdrawal from the socket.

In Fig. 4 the same invention is illustrated as applied to the socket member, this socket member being of substantially the same shape as described for the stud, and so that a solid stud of corresponding shape, as represented in Fig. 5, may pass into the said socket. The socket has the same spiral slits $a$ as described for the stud, forming the springs $b$, so that the socket, under the pressure of the stud into the socket, receives a twisting action, so as to cause the springs $b$ to yield circumferentially, that the socket may expand sufficiently for the introduction or removal of the stud. It will thus be seen that the invention may be applied to either member of the fastener—that is, the stud or the socket—according to which it is desired should be made elastic.

I claim—

1. In a glove-fastener composed of a socket member and a stud member, one of said members composed of a tube closed at one end and contracted below said closed end to form a neck, and with slits $a$ cut through the said member, running spirally from the closed end downward toward the base end, and so as to form springs $b$ between said slits adapted to yield circumferentially, substantially as described.

2. In a glove-fastener, the elastic member composed of a tube closed at one end and contracted below said closed end to form a neck, and with an annular flange E around its open end, the said tube having slits $a$ running spirally from the closed end downward toward the base end, and so as to form springs $b$ between said slits adapted to yield circumferentially, combined with an eyelet, the flange of which is closed over the said flange E, the tubular portion of the eyelet adapted to pass through the flap of the glove and be closed down upon the reverse side as a means for securing the said elastic member to the glove, substantially as described.

CHARLES A. BRYANT.

Witnesses:
FRANK H. BRYANT,
EUGENE C. BRYANT.